(12) United States Patent
Byers et al.

(10) Patent No.: US 10,547,528 B2
(45) Date of Patent: *Jan. 28, 2020

(54) EMERGENCY NETWORK SERVICES BY AN ACCESS NETWORK COMPUTING NODE

(71) Applicant: Cisco Technology, Inc., San Jose, CA (US)

(72) Inventors: Charles Calvin Byers, Wheaton, IL (US); Flavio Bonomi, Palo Alto, CA (US); Jiang Zhu, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,121

(22) Filed: Sep. 19, 2018

(65) Prior Publication Data
US 2019/0020558 A1 Jan. 17, 2019

Related U.S. Application Data

(63) Continuation of application No. 14/192,999, filed on Feb. 28, 2014, now Pat. No. 10,122,604.

(51) Int. Cl.
*H04L 12/26* (2006.01)
*H04L 29/08* (2006.01)
*H04L 12/707* (2013.01)

(52) U.S. Cl.
CPC ......... *H04L 43/0805* (2013.01); *H04L 45/22* (2013.01); *H04L 67/1095* (2013.01); *H04L 67/2861* (2013.01)

(58) Field of Classification Search
CPC ............ H04L 43/0805; H04L 67/2861; H04L 67/1095; H04L 45/22
(Continued)

(56) References Cited

U.S. PATENT DOCUMENTS 6,324,572 B1 * 11/2001 Silverman ............ G06F 9/5027
455/433
6,804,532 B1 10/2004 Moon et al.
(Continued)

OTHER PUBLICATIONS

Perry, "What Comes After the Cloud? How About the Fog?" [online]. Feb. 8, 2013. [retrieved on Dec. 19, 2013]. Retrieved from the Internet: <URL: http://spectrum.ieee.org/tech-talk/computing/networks/what-comes-after-the-cloud-how-about-the-fog>, 1 page.
(Continued)

*Primary Examiner* — David R Lazaro
*Assistant Examiner* — Mariegeorges A Henry
(74) *Attorney, Agent, or Firm* — Leon R. Turkevich

(57) ABSTRACT

In one embodiment, a method comprises detecting, by an access network computing node, a network service provided by a service provider for one or more identified endpoint devices via a wide area network connection, the access network computing node within an access network providing connections for the one or more identified endpoint devices to access the network service via the wide area network connection; detecting an unavailability of the network service via the wide area network connection; and supplying, by the access network computing node, at least a substitute of the network service for the one or more identified endpoint devices in response to the detected unavailability of the network service via the wide area network connection.

15 Claims, 5 Drawing Sheets

(58) Field of Classification Search
USPC .................................. 709/217, 224; 370/216
See application file for complete search history.

(56) References Cited

U.S. PATENT DOCUMENTS

| | | | |
|---|---|---|---|
| 7,415,512 B1 | 8/2008 | Moon | |
| 7,543,020 B2 | 6/2009 | Walker et al. | |
| 7,634,566 B2 | 12/2009 | Turner et al. | |
| 7,818,607 B2 | 10/2010 | Turner et al. | |
| 8,051,170 B2 | 11/2011 | Turner et al. | |
| 8,743,782 B1 | 6/2014 | Patel | |
| 2002/0029268 A1 | 3/2002 | Baca et al. | |
| 2002/0082927 A1 | 6/2002 | Borenstein et al. | |
| 2003/0005078 A1* | 1/2003 | Turicchi, Jr. | H04L 69/40 709/217 |
| 2005/0071470 A1* | 3/2005 | O'Brien | G06F 11/2097 709/226 |
| 2006/0209675 A1* | 9/2006 | Jacobson | H04W 48/08 370/216 |
| 2007/0162260 A1* | 7/2007 | Nordstrom | G06F 9/505 702/186 |
| 2007/0198745 A1 | 8/2007 | Fornari | |
| 2008/0294742 A1 | 11/2008 | Huotari et al. | |
| 2011/0093567 A1 | 4/2011 | Jeon et al. | |
| 2012/0102522 A1* | 4/2012 | Long | H04W 76/50 725/33 |
| 2013/0263125 A1 | 10/2013 | Shamsee et al. | |
| 2014/0016455 A1 | 1/2014 | Ruetschi et al. | |
| 2015/0249586 A1 | 9/2015 | Byers et al. | |

OTHER PUBLICATIONS

Bonomi et al., "Fog Computing and Its Role in the Internet of Things" [online]. Aug. 17, 2012. [retrieved on Dec. 19, 2013]. Retrieved from the Internet: <URL: http://conferences.sigcomm.org/sigcomm/2012/paper/mcc/p13.pdf>, pp. 13-15.

"ETSI M2M Architecture Overview" [online]. Jun. 13, 2012. [retrieved on Sep. 11, 2014]. Retrieved from the Internet: <URL: http://forge.fi-ware.org/plugins/mediawiki/wiki/fiware/index.php?title=ETSI_M2M_Architecture_Overview&oldid=10762&printable=yes, pp. 1-4.

Anonymous, "Fog Computing, Ecosystem, Architecture and Applications—Research at Cisco—Cisco Systems", [online, Feb. 14, 2014, XP055183956, [retrieved on Apr. 17, 2015]. Retrieved from the Internet: <URL: https://web.archive.org/web/20140214031358/http://www.cisco.com/web/about/ac50/ac207/crc_new/university/RFP/rfp13078.html>, 3 pages.

* cited by examiner

EMERGENCY NETWORK SERVICES BY AN ACCESS NETWORK COMPUTING NODE

This application is a continuation of pending application Ser. No. 14/192,999, filed Feb. 28, 2014.

TECHNICAL FIELD

The present disclosure generally relates to providing emergency network services by an access network computing node.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Cloud computing architectures provide on-demand, virtualized services and application as an alternative to the deployment of private computer, storage, and/or networking infrastructures by a user or business. Cloud computing architectures typically are implemented using a centralized data center architecture in a limited number of geographical or logical locations. Hence, users invariably access a cloud computing service via a wide area network, such as the Internet, for reaching a cloud computing data center providing the cloud computing service.

Fog computing has been proposed as a virtualized platform that provides compute, storage, and networking services in a network layer between end devices and traditional cloud computing data centers. The geographic distribution of fog computing enables new services and applications, for example delivering high quality streaming to moving vehicles, improved mobility support, improved support for wireless sensor networks, etc.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
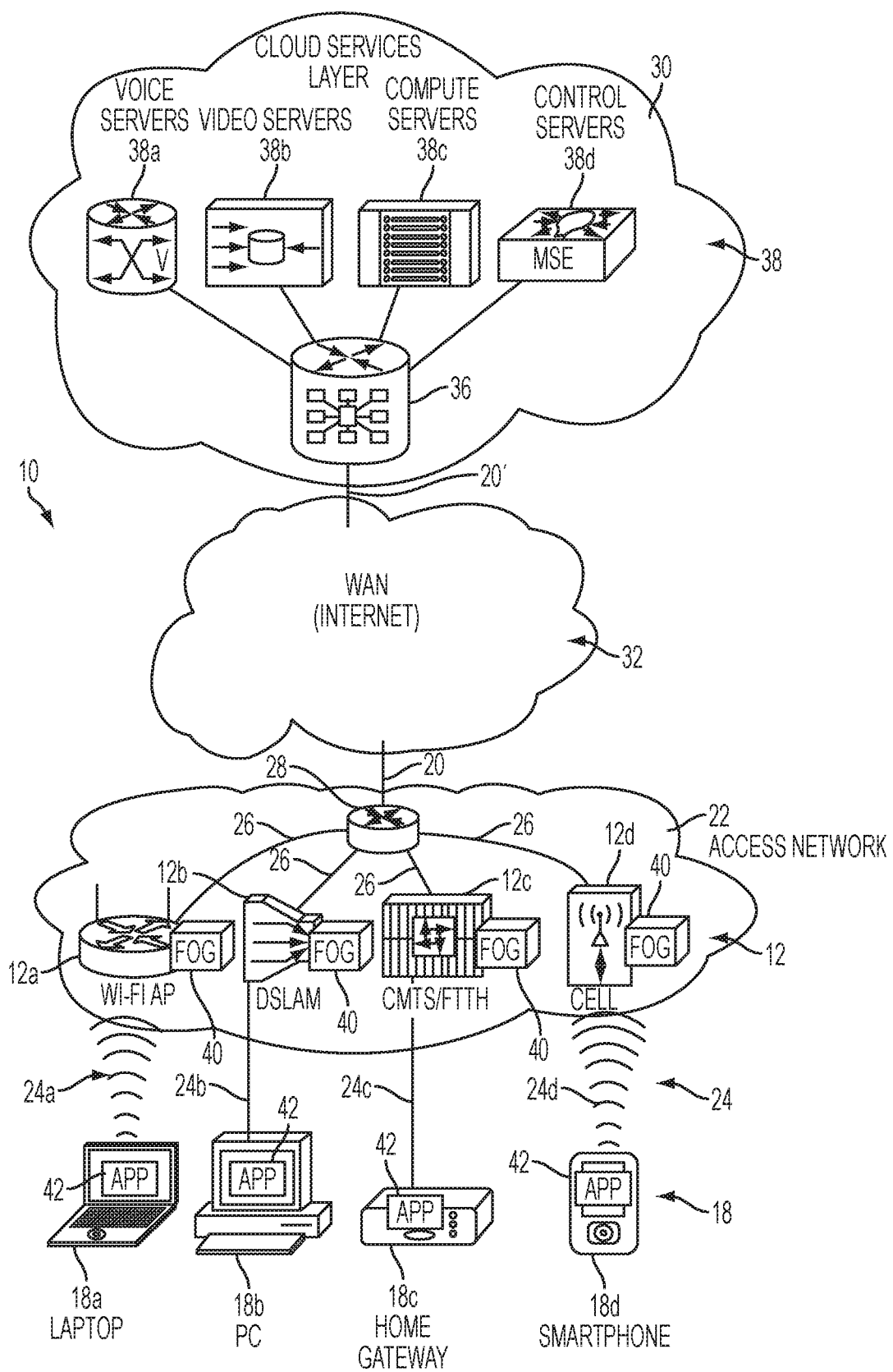
FIG. 1 illustrates an example system having an apparatus for supplying at least a substitute for a network service for an identified endpoint device in response to a detected unavailability of the network service via a wide area network connection, according to an example embodiment.

In one embodiment, a method comprises detecting, by an access network computing node, a network service provided by a service provider for one or more identified endpoint devices via a wide area network connection, the access network computing node within an access network providing connections for the one or more identified endpoint devices to access the network service via the wide area network connection; detecting an unavailability of the network service via the wide area network connection; and supplying, by the access network computing node, at least a substitute of the network service for the one or more identified endpoint devices in response to the detected unavailability of the network service via the wide area network connection.

In another embodiment, an apparatus comprises a network interface circuit, and a processor circuit. The network interface circuit is configured for detecting a network service provided by a service provider for one or more identified endpoint devices via a wide area network connection, the apparatus within an access network providing connections for the one or more identified endpoint devices to access the network service via the wide area network connection. The processor circuit is configured for detecting an unavailability of the network service via the wide area network connection, and supplying at least a substitute of the network service for the one or more identified endpoint devices in response to the detected unavailability of the network service via the wide area network connection.

In another embodiment, logic is encoded in one or more non-transitory tangible media for execution by a machine, and when executed by the machine operable for: detecting, by an access network computing node, a network service provided by a service provider for one or more identified endpoint devices via a wide area network connection, the access network computing node within an access network providing connections for the one or more identified endpoint devices to access the network service via the wide area network connection; detecting an unavailability of the network service via the wide area network connection; and supplying, by the access network computing node, at least a substitute of the network service for the one or more identified endpoint devices in response to the detected unavailability of the network service via the wide area network connection.

DETAILED DESCRIPTION

Particular embodiments enable an access network computing node, also referred to herein as a "fog node", to supply at least substitute of a network service (or at least a portion of the network service) to an identified endpoint device in response to the detected unavailability of the network service normally provided by a service provider via a wide area network connection. In particular, cloud-based network services (e.g., "Google Docs"), also referred to herein as "virtualized cloud services", are normally provided by enabling an endpoint device (e.g., a user computing device) to access, via a wide area network connection, a data center controlled and managed by a service provider to provide virtualized compute, network, and/or storage services in the "cloud". Hence, a user normally can access a cloud-based network service via a wide area network connection. More advanced cloud-based network services can include business services such as collaborative meetings (e.g., WebEx), financial transactions such as coordinated ATM transactions, etc.

Such cloud-based network services become unavailable, however, if the wide area connection is disrupted, for example due to a hardware failure of the data link connecting the access network to the wide area network, or severe congestion that renders the wide area network connection substantially incapable of providing the minimum quality of service (QoS) requirements necessary for the network service. In particular, the access and backhaul networks within core networks that provide wide area network connections are not perfectly reliable, and often are subject to dynamic traffic levels that occasionally create overload conditions; consequently, any cloud-based network service that requires a prescribed minimum quality of service (QoS) is rendered unavailable during instances where network overload is encountered in the wide area network connections. Servers in the cloud providing cloud-based network services are subject to overload and attacks (such as unanticipated focused loads, distributed denial of service attacks or hacking) that render them too slow to meet the minimum response time requirements. Further, one or more data links in a wide area network connection may be physically damaged in emergency situations (e.g., natural disasters, terrorist attacks, damage due to construction or vehicular mishaps, etc.) that result a physical breakage that can disrupt the cloud-based network services for an extended time period until the physical breakage can be repaired.

According to an example embodiment, an access network computing node can provide at least a substitute of the cloud-based network service while the wide area network connection is unavailable due to network outage or physical damage, or at least a portion of the network service. In one embodiment, an access network computing node detects a network service provided by a service provider via a wide area network connection for an identified endpoint device, for example a cloud-based collaborative meeting service, virtualized office application services, etc.; in response to detecting an unavailability of the network service via the wide area network connection, the access network computing node can supply at least a substitute of the network service for one or more of the identified endpoint devices. Hence, even though an access network computing node cannot provide the large-scale capacity and performance of a cloud-based service provider, the access network computing node can provide (at least) a "substitute" of the network service on a temporary or emergency basis while the network service is unavailable via the wide area network connection. Hence, the substitute of the network service can be provided as an alternative to the network service that is not available via the wide area connection. As used herein, the term "substitute" includes a portion (i.e., subset) of the network service normally provided by the service provider via the wide area network connection.

FIG. 1 illustrates an example system 10 having an apparatus 12 for supplying at least a substitute (14 of FIG. 4) for a network service (16 of FIG. 4) for an identified endpoint device 18 in response to a detected unavailability of the network service via a wide area network connection 20, according to an example embodiment. The apparatus 12 is a physical machine (i.e., a hardware device) configured for implementing network communications with other physical machines 18, 28, 36, and/or 38 via the system 10.

As illustrated in FIG. 1, the system 10 includes an access network 22, also referred to herein as a "fog network". The access network 22 comprises access network computing nodes 12, also referred to as "fog nodes", that provide link layer data connections 24 for endpoint devices 18. Example access network computing nodes 12 can include a Wi-Fi access point (AP) 12a configured for providing a Wi-Fi wireless data link 24a for a Wi-Fi enabled device 18a, a digital subscriber line (DSL) access multiplexer (DSLAM) 12b configured for providing a DSL link 24b for one or more endpoint devices 18b via a DSL modem (not shown), a cable modem termination system (CMTS) 12c configured for providing a cable connection (e.g., DOCSIS) 24c (and/or Fiber to-the-Home (FTTH) access node 12c configured for providing a Passive Optical Network (PON) and/or Active Optical Network (AON) connection 24c) to an endpoint device 18c such as a home gateway device (e.g., a "set top box"); and/or a wireless telephone (e.g., 4G and/or Long Term Evolution (LTE)) base station (e.g., an "eNodeB") 12d providing a wireless telephone data link 24d to a smartphone device 18d. Other access network computing nodes 12 can be implemented that utilize different access technologies for link layer data connections 24, for example WiMAX, wireless sensor network connections such as WiHART, ISA100, etc.

Each access network computing node 12 can provide at least one access network connection 26 to an access network gateway router 28. The access network gateway router 28 can be configured to provide (and/or monitor) one or more wide area network (WAN) connections 20 that enable the endpoint devices 18 (via their access network computing nodes 12) to reach a service provider 30 providing cloud-based network services (16 of FIG. 4) via a wide area network 32 such as the Internet. Hence, each access network computing node 12 provides a link layer data connection 24 to an endpoint device 18 for reaching the access network 22, and one or more access network connection 26 for reaching a gateway router 28 configured for providing the wide area network connection 20 for reaching the wide area network 32.

The service provider 30 that provides cloud computing services (16 of FIG. 4) also includes one or more gateway routers 36 providing one or more wide area network connections 20' for providing network connectivity between the service provider 30 and the wide area network 32. The service provider 30 can include different hardware-based virtualized servers 38, depending on the cloud computing service 16 being offered to users of the endpoint devices 18. Example virtualized servers can include a voice server 38a providing virtualized call manager applications such as Voice over IP (VoIP) based calling services, a video server 38b providing on-demand streaming video, a compute server 38c providing virtualized compute services such as distributed web hosting or distributed office applications, a control server 38d providing virtualized control and orchestration functions for virtualized network functions such as Infrastructure as a Service (IaaS), Platform as a Service (PaaS), and/or Software as a Service (SaaS), etc.; other virtualized services can be provided by the service provider 30.

Figure 4:
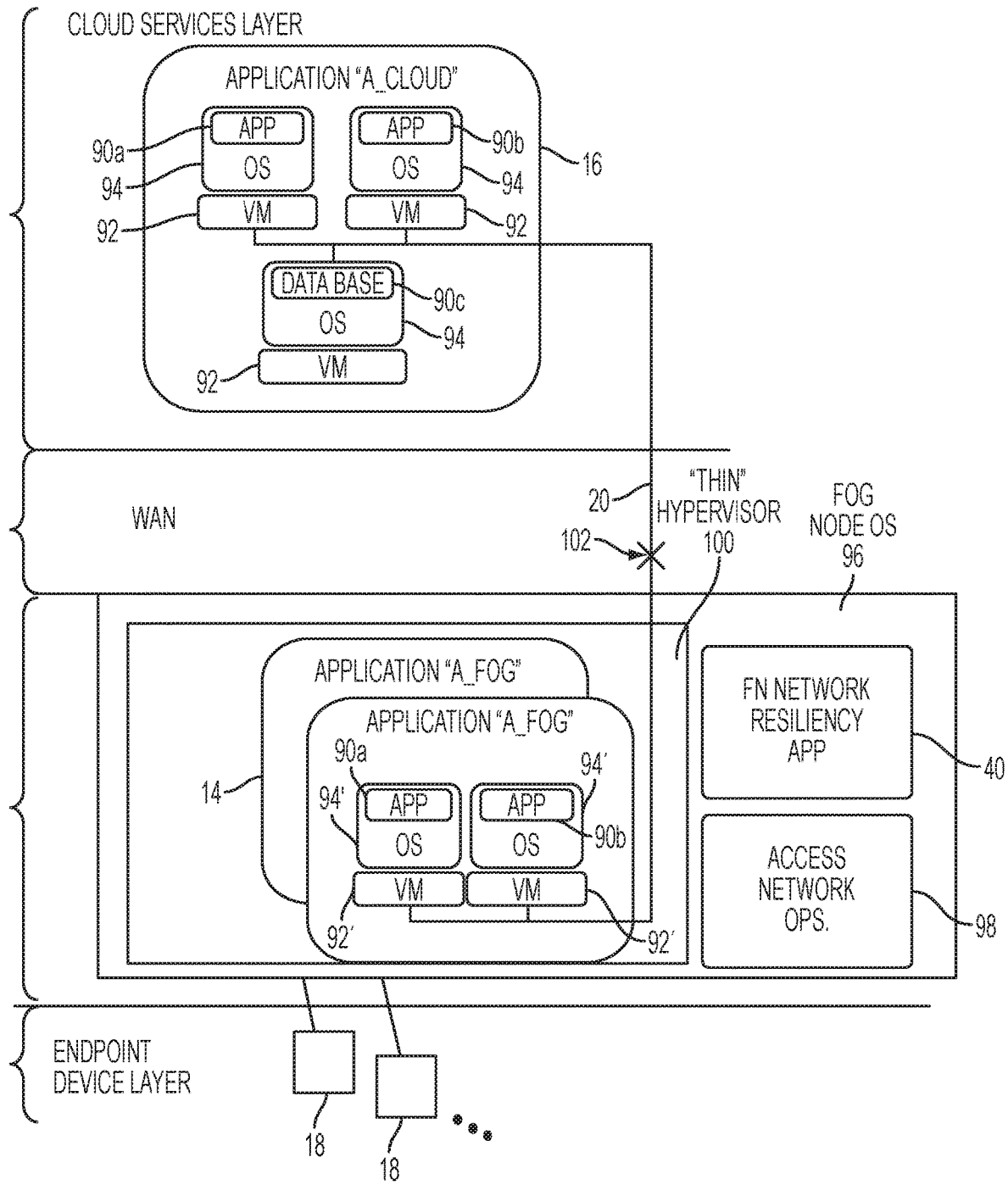
FIG. 4 illustrates in further detail the apparatus of FIG. 1 supplying a substitute of a network service, based on obtaining an executable resource from a cloud-based service provider for execution of the substitute of the network service, according to an example embodiment.

As illustrated in FIG. 1 and FIG. 4, each access network computing node 12 can include a fog node (FN) network resiliency module 40. Each fog node network resiliency module 40 can be configured for detecting cloud-based network services (16 of FIG. 4) provided by the service provider 30 for any one of the endpoint devices 18.

As described in further detail below with respect to FIGS. 3A, 3B and 4, the fog node network resiliency module 40 (executed for example by a processor circuit 46 of FIG. 2 and/or a logic circuit) can respond to detection of the cloud-based network service by obtaining an executable resource that enables the access network computing node 12 to execute at least a substitute 14 of the corresponding network service 16 in the event that the cloud-based network service 16 is unavailable via the wide area network connection 20 and/or 20'. In particular, the access network computing node 12 can receive the executable resource (e.g., one or more Java virtual machines (JVM) providing at least a portion of the cloud-based network service 16) from the service provider 30 providing the associated network service 16, or another prescribed location; the access network computing node 12 can maintain the executable resource in an idle/suspended state while the cloud-based network service 16 is available via the wide area network connections 20 and 20'. In response to detecting that the cloud-based network service 16 is no longer available via the wide area network connection 20 and/or 20', the network resiliency module 40 executed by the access network computing node 12 can activate the executable resource to provide at least a substitute 14 of the network service for the endpoint devices 18.

The endpoint devices 18 also can include endpoint registration modules 42 (executed for example by a processor circuit 46 of FIG. 2 and/or a logic circuit) that can send a registration to the corresponding network resiliency module 40 of the access network computing node 12 providing the corresponding data link 24. The registration can specify, for an identified client device 18, the identity of the endpoint device 18, the cloud-based network services 16 being accessed by the endpoint device 18, the destination service provider 30 being accessed for the each identified cloud-based network service 16, etc. The registration also can identify whether the corresponding identified endpoint device 42 has available resources (e.g., compute, storage, and/or network) that can be used during an emergency for at least partial execution of at least a substitute 14 of the cloud-based network services 16. The available resources can be specified in terms of available processing capacity, memory storage capacity, wireless capabilities (e.g., WiFi, Bluetooth, etc.) indicating whether the endpoint device 42 can serve as an ad hoc network node for forwarding data traffic, etc. Hence, the fog node network resiliency application 40 can determine not only the substitute network services 14 needed by an endpoint device 18, but also whether the endpoint device 18 has available resources that can be borrowed during cases of emergency.

The registration also can include personal information specifying an attribute of the user of the corresponding identified endpoint device 18, for example specifying whether the user is a first responder (e.g., firefighter, medical personnel, security, etc.) that can render assistance in case of emergency (additional details of personal information that can be supplied during registration are illustrated in further detail below). The personal information can be stored confidentially, along with the remaining registration information, by the fog node network resiliency application 40 in a memory circuit (or memory device local within the access network 22) as contact information that can be used to contact the user for emergency assistance, described below.

Figure 2:
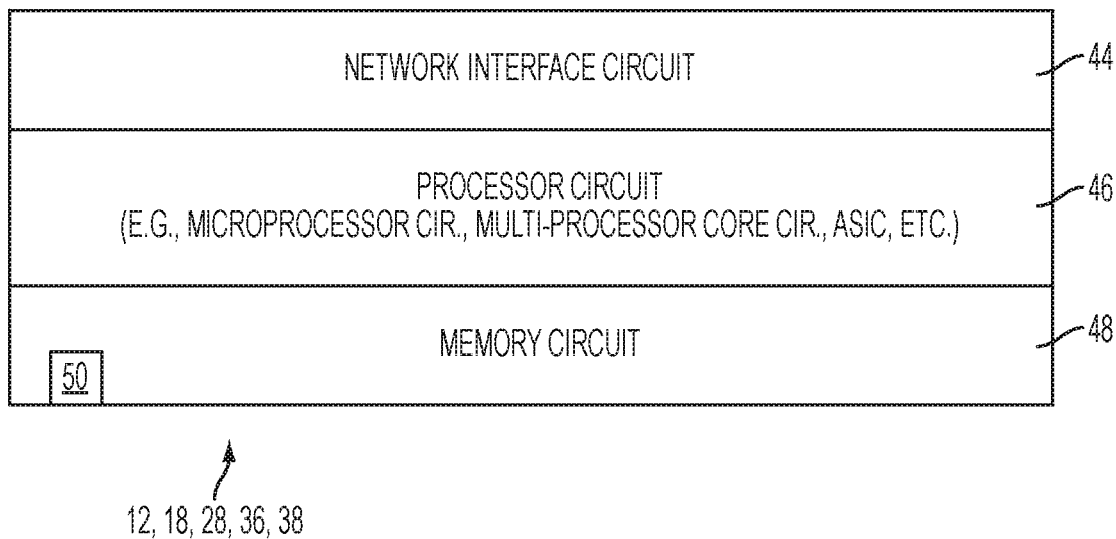
FIG. 2 illustrates an example implementation of the apparatus of FIG. 1, according to an example embodiment.

FIG. 2 illustrates an example implementation of any one of the devices 12, 18, 28, 36, and/or 38 of FIG. 1, according to an example embodiment.

Each apparatus 12, 18, 28, 36, and/or 38 can include a network interface circuit 44, a processor circuit 46, and a memory circuit 48. The network interface circuit 44 can include one or more distinct physical layer transceivers for communication with any one of the other devices 12, 18, 28, 36, and/or 38 according to the appropriate physical layer protocol (e.g., WiFi, DSL, DOCSIS, 3G/4G, Ethernet, etc.) via any of the links 20, 20', 24a, 24b, 24c, 24d, 26 (e.g., a wired or wireless link, an optical link, etc.), as appropriate. The processor circuit 46 can be configured for executing any of the operations described herein, and the memory circuit 48 can be configured for storing any data or data packets as described herein.

Any of the disclosed circuits of the devices 12, 18, 28, 36, and/or 38 (including the network interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, rotating disk, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 3A:
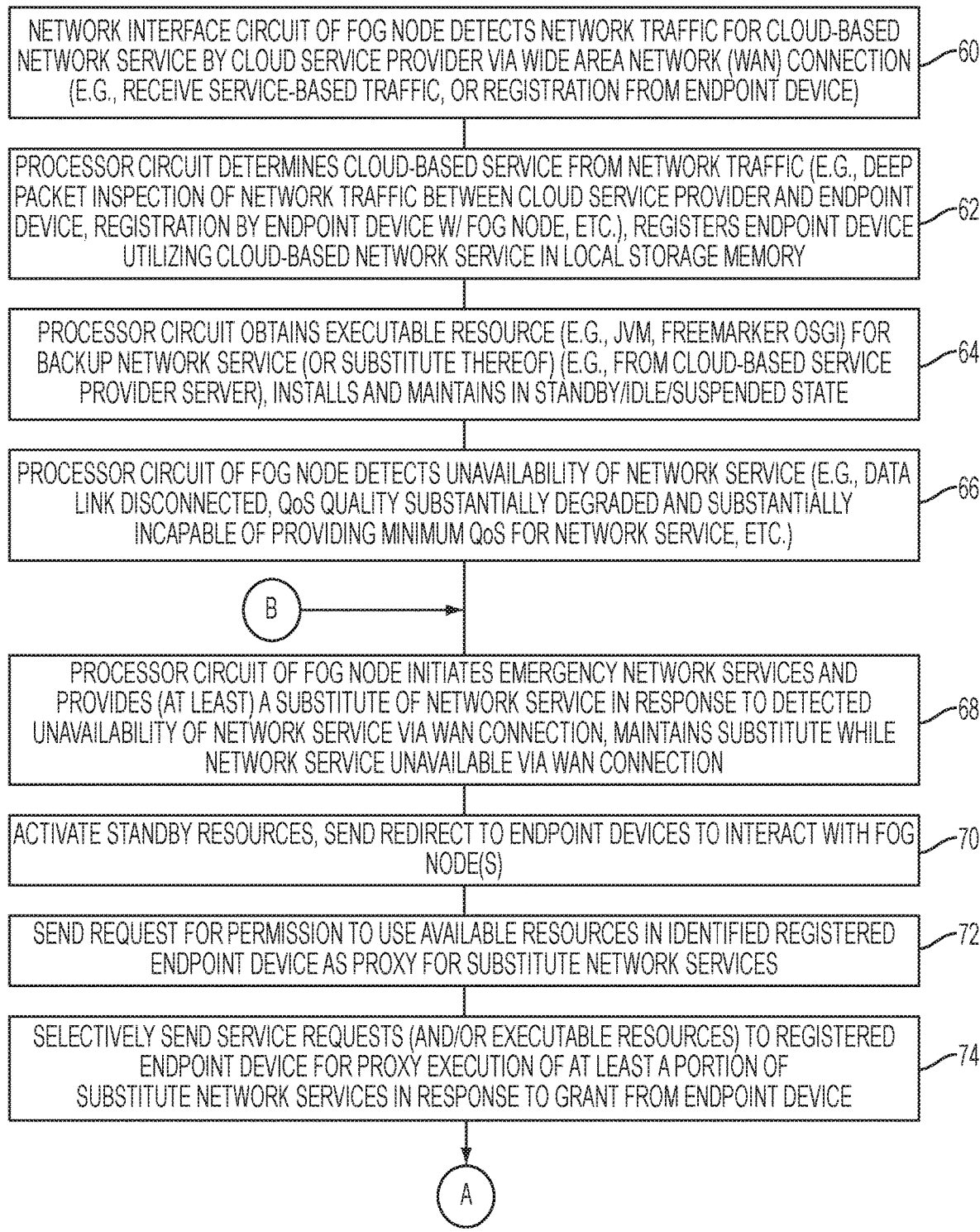
FIGS. 3A and 3B illustrate an example method for an apparatus supplying at least a substitute for a network service for an identified endpoint device in response to a detected unavailability of the network service via a wide area network connection, according to an example embodiment.
Figure 3B:
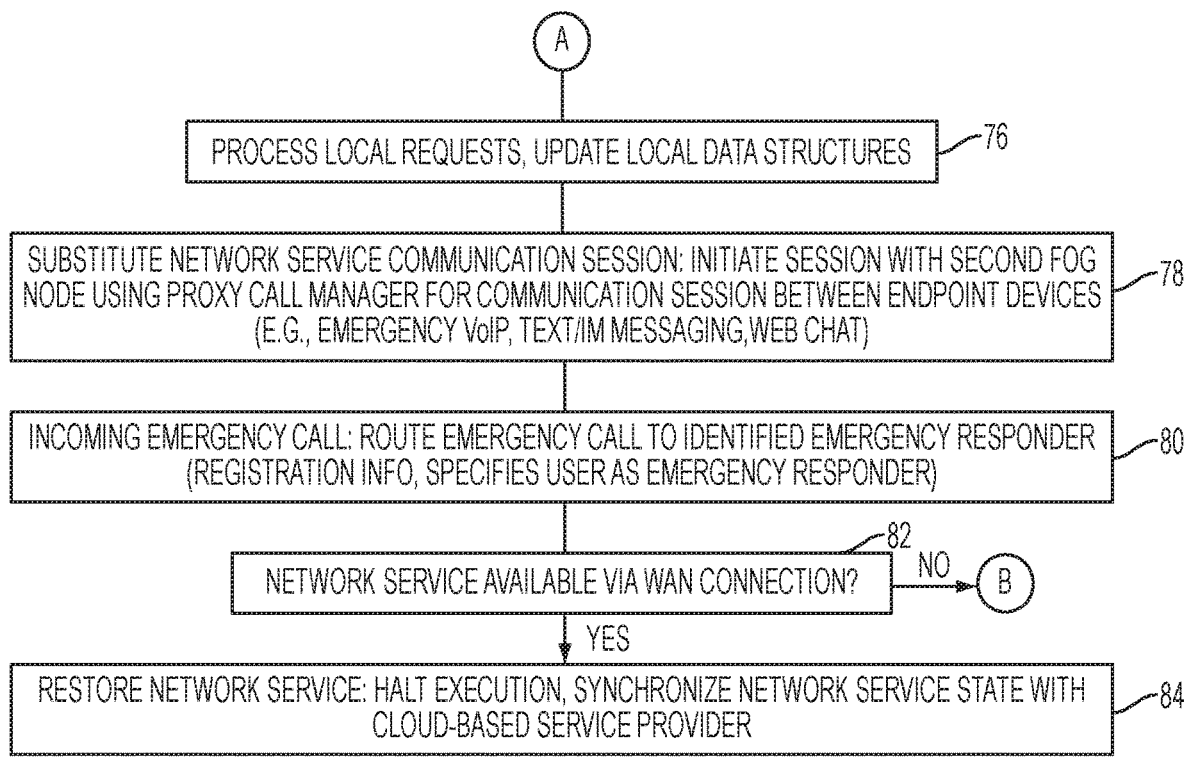

FIGS. 3A and 3B illustrate an example method for an apparatus 12 supplying at least a substitute 14 for a network service 16 for an identified endpoint device 18 in response to a detected unavailability of the network service 16 via a wide area network connection 20 and/or 20', according to an example embodiment.

FIG. 4 illustrates in further detail the apparatus of FIG. 1 supplying a substitute 14 of a network service 16, based on obtaining an executable resource (e.g., from a cloud-based service provider or another authorized source), for execution of the substitute of the network service, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic (implemented using one or more integrated circuits) that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-4 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to operation 60 of FIG. 3A, the network interface circuit 44 of the fog node 12 can detect network traffic for a cloud-based network service 16 offered by the cloud service provider 30 via the WAN connection 20. For example, the network interface circuit 44 can detect the network service 16 based on receiving the service-based traffic between the link layer data connection 24 and the access network connection 26; the network interface circuit 44 also can detect the network service 16 based on receiving a registration from the endpoint device 18 that specifies the cloud-based services 16 in use by the endpoint device 18.

The network resiliency application 40 executed by the processor circuit 46 of the fog node 12 can determine in operation 62 the cloud-based service in use by the endpoint device 18 based on the network traffic between the service provider 30 and the endpoint device 18 as received by the network interface circuit 44, and/or based on the registration received from the endpoint device 18. For example, the processor circuit 46 can execute deep packet inspection of the network traffic to identify the network service 16, or can process the registration received from the endpoint registration module 42 of the endpoint device 18. The processor circuit in operation 62 can create a data structure (50 of FIG. 2) in local storage memory that identifies the endpoint device 18 and the one or more cloud-based network services 16 in use by the endpoint device 18, including any information from the received registration. The data structure 50 can be stored on another device that is locally reachable within the access network 22; the processor circuit 46 of the fog node 12 also can periodically update the data structure 50, as appropriate.

For example, if a user of a smartphone 18d subscribes to an enhanced 911 mobile application (e.g., 90a), the user can provide registration data within the registration as part of the service activation for the cloud-based service 16 provided by the application 90a: example registration data can include home address of the user, names of family members, emergency contacts, etc. This registration data is primarily stored in cloud servers, but a local copy is also stored within a data structure 50 in the fog nodes 12 near the user's home/ workplace so that the fog nodes 12 can access the registration data in an emergency. If the user roams between access points (e.g., 12a), a secure copy of the registration data also can "roam" along with the user. As another example, a deployment of an intersection for a smart highway can include various sensors, cameras, lights, and gates connected to a fog node 12 (e.g., 12a) at the intersection, where the information from the sensors at the intersection can be sent to cloud servers via the intersection fog node (e.g., 12). However, the configuration information associated with the sensors at the intersection also can be sent to other fog nodes 12 in the region, permitting, for example, a first responder to access a camera feed directly from the intersection even if the primary cloud servers offered by the service provider 38 are down or unreachable.

In response to detecting the network service 16 that is provided by the service provider 30 for one or more of the identified endpoint devices 18, the network resiliency application 40 executed by the processor circuit 46 can obtain in operation 64 one or more executable resources for execution of at least a substitute (14 of FIG. 4) of the network services 16 for the identified endpoint devices 18. For example, FIG. 4 illustrates that the network service 16 is based on one or more physical machines in the service provider 30 executing virtualized applications 90a, 90b, and 90c within virtual machines (VM) 92 providing host operating systems (OS) 94. The virtualized applications 90a and 90b can be applications providing a virtualized client application, and the virtualized application 90c can be a virtualized database application 90c providing scalable database management within a data center. FIG. 4 also illustrates that the fog node operating system 96 (executed by the processor circuit 46 with operating system execution state variables stored in the memory circuit 48) can include not only the native access network operation module 98 for performing access network operations, but also can include a "thin" hypervisor 100 that can control execution of a "thin" virtual machine 92' hosting a thin operating system 94' for emergency mode execution of the executable resources 90a and 90b.

Hence, the network resiliency application 40 executed by the processor circuit 46 of the fog node 12 can obtain an executable resource 90, for example one or more Java virtual machines (JVM) and/or Freemarker OSGI, etc., as appropriate, and install the executable resource 90 within the virtual environment controlled by the virtual machines 92'. Note that although the thin hypervisor 100 may not include the installation of the virtualized database application 90c (e.g., due to size constraints), the substitute 14 may be an acceptable alternative to the cloud-based network service 16 based on the reduced data requirements that would be encountered by the fog node 12, described below. The hypervisor 100 executed by the processor circuit 46 can maintain the executable applications 90a and 90b contained within the virtual machines 92' in a standby/idle/suspended state while the cloud-based network services 16 are available via the wide area network connection 20; the hypervisor 100 also can maintain all of the thin virtual machines 92' in a standby/idle/suspended state while the cloud-based network services 16 are available, in order to minimize consumption of resources in the fog node 12.

Assume in operation 66 that the network resiliency application 40 executed by the processor circuit 46 of the fog node 12 detects that the cloud-based network service 16 is unavailable via the WAN connection 20 and/or 20' (e.g., a network disruption at event 102 of FIG. 4). In one embodiment, the processor circuit 46 can implement execution metrics that monitor the performance of the cloud-based network service (e.g., whether a video stream provides continued disruption or an unacceptable amount of jitter, whether queries from endpoint devices 18 are responded to by virtualized servers 38 with acceptable latency, etc.); alternately, the network resiliency application 40 can detect a total loss of the cloud-based network services 16. The network resiliency application 40 also can use network-based metrics to determine whether the quality of service in the WAN link 20 is substantially degraded and substantially incapable of providing a minimum quality of service for the network service (i.e., the guaranteed quality of service is consistently less than the required quality of service), or whether the data link 20 is disconnected.

The network resiliency application 40 also can detect that the cloud-based network service 16 is unavailable via the WAN connection 20 and/or 20' via other methods. Example methods of determining unavailability of the cloud-based network service can include a detected absence of periodic "heartbeat" messages (e.g., where a server 38 for a particular cloud-based service is expected to send a heartbeat message every ten seconds) or ping responses. In particular, the network resiliency application 40 can periodically transmit a ping message to a cloud-based server 38 for a specific cloud-based application service 38, and determine the cloud-based service 38 is unavailable if a response to the ping message is not received within a prescribed time interval, and/or if a response is not received after successive transmission of a prescribed number of ping messages. Other examples of detecting the cloud-based service is unavailable can include the network resiliency application 40 detecting a number of timeout messages, proxy error messages, detecting TCP/IP timers are exceeding TTL (time to live) timers, prescribed error messages (e.g., HTTP 404 errors), etc.

The network resiliency application 40 executed by the processor circuit 46 in operation 68 can initiate emergency network services 14 in response to the detected unavailability of the network service 16 via the WAN connection 20 (e.g., at event 102 of FIG. 4), to provide at least a substitute 14 of the cloud-based network services 16. The network resiliency application 40 executed by the processor circuit 46 can maintain at least the substitute 14 of cloud-based network services 16 while the network service is unavailable via the WAN connection 20 and/or 20'. For example, the network resiliency application 40 executed by the processor circuit 46 in operation 70 can activate standby resources 92', 94', and the associated executable virtualized applications 90*a* and 90*b* within the virtual machines 92'. The network resiliency application 40 also can send a redirect notification to the corresponding endpoint registration module 42 of one or more of the registered endpoint devices 18: as part of the redirect notification that notifies the endpoint registration module's 42 of the activating of the substitute network services 14, the notification can include in operation 72 a request for permission to use the available resources within the endpoint device 18 as a proxy for executing a portion of the substitute network services 14 (the permission can be for the "proxy" to execute the substitute network service 14 consumed by the endpoint device 18 as a client (e.g., endpoint device 18*a* serves as both client and proxy server for the substitute network service 14), or to execute different network service consumed by another different endpoint device (e.g., endpoint device 18 serves as proxy server for substitute network service 14 consumed by endpoint devices 18*b*, 18*c*, and/or 18*d*).

In response to receiving a grant from the endpoint registration module 42 within an identified endpoint device 18, the fog node resiliency module 40 executed by the processor circuit 46 can send in operation 74 any service requests (and/or any relevant executable resources 90*a* and/or 90*b*) to the identified endpoint device 18 for distributed execution of at least a portion of the substitute network service 14, enabling the endpoint device 18 to provide proxy execution of at least a portion of the substitute network service 14. As apparent from the foregoing, the offering of substitute network services 14 by the fog node 12 can serve as an incentive for endpoint devices 18 to "lend" available resources during times of emergency. Hence, the substitute network services 14 can be supplied in a scalable manner, since endpoint devices 18 that desire the substitute network services 14 can be requested to lend available resources for distributed execution to supplement the processing, storage, and network capacity available in the access network computing node 12.

Referring to FIG. 3B, the fog node network resiliency application 40 executed by the processor circuit 46 can process local requests from connected endpoint devices 18 for the substitute network service 14, and update local data structures accordingly in operation 76. In one embodiment, one of the substitute network services 14 can be a virtualized proxy call manager that can provide in operation 78 a substitute network service communication session. In particular, the processor circuit 46 (e.g., in fog node 12*d*) executing the virtualized call manager can initiate a communication session with a second fog node (e.g., 12*c*), enabling a communication session between different endpoint devices (e.g., 18*d*, 18*c*) that are connected to different fog nodes (e.g., 12*a*, 12*c*). Such communication sessions can be established based on priority, for example emergency voice over IP messages for first responders, text messaging or instant messaging, Web chat messaging, etc. The fog network node resiliency application 40 also can prioritize the deployment of substitute network services according to service type, user type, etc. As described previously, a registration also may specify personal information specifying an attribute of the user, for example whether the user is a first responder such as a fireman, a doctor, a police officer, etc. A user also may register certain skills or assets, for example emergency medical training, skill operating heavy equipment, military training, etc.; example assets can include availability to emergency generators, marine vessels for flood emergencies, volunteer worker, etc. Hence, if in operation 80 a virtualized proxy call manager detects an incoming emergency call, the virtualized proxy call manager (e.g., 90*a*) can route the emergency call to the identified emergency responder in operation 80.

The personal information also can identify whether an individual has special needs; for example, a family with small children may require more substantial shelter in a natural disaster than a healthy young adult who is unmarried and has no children; a special needs person may need assistance with transportation or regular medical supplies (e.g. insulin), etc. Hence, an example application executed by the fog node network resiliency application can include matching individuals requiring assistance with responders emergency skills, and permitting emergency communications between the individuals requiring assistance and the responders, including matching communications between family members.

Other capabilities of the endpoint devices 18 also can be registered with the fog node network resiliency application 40, as needed, for example whether alternative communication methods are available for reaching the wide area network 32. Other virtualized applications that can be provided include authorizing and recording transactions associated with emergency dispensing of a limited amount of cash from automated teller machines (e.g., up to a prescribed limited amount each day), where the fog node resiliency application 40 can store the debited amounts for the users in a local storage. Other authentication or authorization service can be provided, as needed, for example selective authorization for use of smartphone devices based on first responder status, sharing of resources for proxy execution of substitute network services 14, etc.

As described previously, the substitute network services 14 are maintained while the cloud-based network services 16 are not available via the wide area network connection 20. If in operation 82 the fog node network resiliency application 40 executed by the processor circuit 46 determines that the cloud-based network services 16 are now available via the WAN connection, the fog node network resiliency application 40 can restore the cloud-based network service 16 based on halting execution of the substitute network service 14, sending redirect notices to the endpoint devices 18, and synchronizing the network service state (and associated data structures 50 such as debited cash from customer bank accounts) with the cloud-based service provider 30 in operation 84. As apparent from the foregoing description of detecting the unavailability of the cloud-based network service 38, various methods can be applied to determine that the cloud-based network services 16 are available: example methods can include detecting new heartbeat messages from a server 38, detecting a new response to a ping message output by the network resiliency application 40 (note the ping messages still can be output by the fog node 12 despite the emergency node to serve as a "beacon" for detecting the server 38); note that the network resiliency application 40 may apply a hysteresis function (e.g., wait a prescribed time interval before exiting emergency mode) to prevent "ping-pong" behavior. In particular, the network resiliency application 40 can apply a hysteresis function in operations 66 and 82 (e.g., initiating a timer that waits tens of seconds) to ensure network resiliency application 40 does not prematurely jump between emergency mode and non-emergency mode, resulting in oscillations ("ping-pong") between the two modes. The network resiliency application 40 also can apply adaptive algorithms to adjust the timers in response to detected oscillations between the two modes. Authorized personnel also can manually change between the two modes, for example for an emergency override, for routine maintenance that requires the access network 22 be taken temporarily "offline".

According to example embodiments, fog computing capabilities are added to access points and other access network devices that enable continued operation of at least some cloud-based computing services, even if the cloud-based service providers are unreachable. Hence, critical cloud-based network services (mission-critical, revenue critical, life critical, etc.) can be maintained even if the cloud-based service provider is unavailable. In addition, the example embodiments can temporarily supplement cloud-based service providers if service response times reach unacceptable levels for critical applications. As apparent from the foregoing, operations by the processor circuit 46 in the access network computing node 12 can include preregistering applications, user attributes, and/or device capabilities, and pre-populating code, databases, and other executable resources in anticipation of the need to enter the "emergency" mode or "resiliency" mode.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

detecting, by an access network computing node within an access network, a network service provided by a service provider for one or more identified endpoint devices via a wide area network connection between the access network and a wide area network providing reachability to the service provider;

providing, by the access network computing node, a link layer data connection for the one or more identified endpoint devices to access the network service via the access network and the wide area network connection;

detecting, by the access network computing node, an unavailability of the network service to the access network via the wide area network connection, including detecting that the network service that was available to the access network via the wide area network connection is no longer available; and executing, by the access network computing node, at least a substitute of the network service for the one or more identified endpoint devices via the link layer data connection in response to the detected unavailability of the network service to the access network via the wide area network connection, and providing, by the access network computing node, said at least a substitute of the network service to the one or more identified endpoint devices via the link layer data connection provided by the access network computing node, wherein the executing includes: the access network computing node obtaining an executable resource for execution of at least the substitute of the network service for the one or more identified endpoint devices; and activating the execution of at least the substitute of the network service in response to detecting the unavailability of the network service via the wide area network connection, including sending a notification to the one or more identified endpoint devices of the activating.

2. The method of claim 1, wherein the detecting of the network service is based on at least one of:

the access network computing node detecting the network service based on detecting associated network traffic between the one or more identified endpoint devices and the service provider via the wide area network connection; or the access network computing node receiving, from the one or more identified endpoint devices, a registration that specifies the corresponding identified endpoint device is configured for accessing the network service.

3. The method of claim 1, wherein the detecting of the network service is based on:

receiving, by the access network computing node from the one or more identified endpoint devices, a registration that specifies the corresponding identified endpoint device is configured for accessing the network service; and storing by the access network computing node the registration in a memory locally within the access network.

4. The method of claim 1, wherein:

the executing includes the access network computing node determining whether any one of the one or more identified endpoint devices can serve as a proxy server device for at least partial execution of at least the substitute of the network service or a different network service; and the method further comprises sending at least one of the executable resource, or data associated with at least the substitute of the network service or the different network service, to the proxy server device, for distributed execution of at least the substitute of the network service or the different network service, in response to receiving a grant from the corresponding any one of the one or more identified endpoint devices.

5. The method of claim 1, wherein the executing includes initiating a communication session with a second access network computing node in the access network for coordinated supply of at least the substitute of the network service between first endpoint devices in communication with the access network computing node and second endpoint devices in communication with the second access network computing node.

6. The method of claim 5, wherein the registration includes personal information specifying an attribute of a user of the corresponding identified endpoint device, the executing including initiating at least the substitute of the network service between the user and a second user of a second corresponding identified endpoint device, based on the attribute.

7. The method of claim 1, further comprising the access network computing node restoring the network service provided by the service provider in response to detecting a resumed availability of the network service via the wide area network following the detected unavailability, including: halting execution of at least the substitute of the network service in the access network; and synchronizing network service state with the service provider, based on the supply of at least the substitute of network service during the unavailability of the network service, for restoration of the network service by the service provider.

8. An apparatus comprising:
a network interface circuit configured for detecting a network service provided by a service provider for one or more identified endpoint devices via a wide area network connection between an access network and a wide area network providing reachability to the service provider, the apparatus within the access network, the network interface circuit further configured for providing a link layer data connection for the one or more identified endpoint devices to access the network service via the access network and the wide area network connection; and
a processor circuit configured for detecting an unavailability of the network service to the access network via the wide area network connection, including detecting that the network service that was available to the access network via the wide area network connection is no longer available, the processor circuit further configured for executing at least a substitute of the network service for the one or more identified endpoint devices via the link layer data connection in response to the detected unavailability of the network service to the access network via the wide area network connection, the processor circuit further configured for providing said at least a substitute of the network service to the one or more identified endpoint devices via the link layer data connection provided by the device interface circuit;
wherein the processor circuit is configured for executing at least the substitute of the network service based on:

obtaining an executable resource for execution of at least the substitute of the network service for the one or more identified endpoint devices; and activating the execution of at least the substitute of the network service in response to detecting the unavailability of the network service via the wide area network connection, including sending a notification to the one or more identified endpoint devices of the activating.

9. The apparatus of claim 8, wherein the network interface circuit is configured for detecting the network service based on at least one of:
detecting associated network traffic between the one or more identified endpoint devices and the service provider via the wide area network connection; or
receiving, from the one or more identified endpoint devices, a registration that specifies the corresponding identified endpoint device is configured for accessing the network service.

10. The apparatus of claim 8, wherein:
the network interface circuit is configured for detecting the network service based on receiving, from the one or more identified endpoint devices, a registration that specifies the corresponding identified endpoint device is configured for accessing the network service;
the processor circuit configured for storing the registration in a memory locally within the access network.

11. The apparatus of claim 8, wherein:
the processor circuit is configured for determining whether any one of the one or more identified endpoint devices can serve as a proxy server device for at least partial execution of at least the substitute of the network service or a different network service;
the processor circuit further configured for sending at least one of the executable resource, or data associated with at least the substitute of the network service or the different network service, to the proxy server device, for distributed execution of at least the substitute of the network service or the different network service, in response to receiving a grant from the corresponding any one of the one or more identified endpoint devices.

12. The apparatus of claim 8, wherein the executing includes initiating a communication session with a second apparatus in the access network for coordinated supply of at least the substitute of the network service between first endpoint devices in communication with the apparatus and second endpoint devices in communication with the second apparatus.

13. The apparatus of claim 8, wherein the processor circuit is configured for restoring the network service provided by the service provider in response to detecting a resumed availability of the network service via the wide area network following the detected unavailability, including:
halting execution of at least the substitute of the network service in the access network; and synchronizing network service state with the service provider, based on the supply of at least the substitute of network service during the unavailability of the network service, for restoration of the network service by the service provider.

14. Logic encoded in one or more non-transitory tangible media for execution by a machine and when executed by the machine operable for:
detecting, by an access network computing node within an access network, a network service provided by a service provider for one or more identified endpoint devices via a wide area network connection between the access network and a wide area network providing reachability to the service provider;

providing, by the access network computing node, a link layer data connection for the one or more identified endpoint devices to access the network service via the access network and the wide area network connection;

detecting, by the access network computing node, an unavailability of the network service to the access network via the wide area network connection, including detecting that the network service that was available to the access network via the wide area network connection is no longer available; and executing, by the access network computing node, at least a substitute of the network service for the one or more identified endpoint devices via the link layer data connection in response to the detected unavailability of the network service to the access network via the wide area network connection, and providing, by the access network computing node, said at least a substitute of the network service to the one or more identified endpoint devices via the link layer data connection provided by the access network computing node;

wherein the executing includes: the access network computing node obtaining an executable resource for execution of at least the substitute of the network service for the one or more identified endpoint devices; and activating the execution of at least the substitute of the network service in response to detecting the unavailability of the network service via the wide area network connection, including sending a notification to the one or more identified endpoint devices of the activating.

15. The logic of claim 14, when executed by the machine further operable for restoring the network service provided by the service provider in response to detecting a resumed availability of the network service via the wide area network following the detected unavailability, including:

halting execution of at least the substitute of the network service in the access network; and synchronizing network service state with the service provider, based on the supply of at least the substitute of network service during the unavailability of the network service, for restoration of the network service by the service provider.

* * * * *